March 22, 1932. W. A. MORTON ET AL 1,850,968
GLASS TRANSFER MECHANISM
Filed June 24, 1929  3 Sheets-Sheet 1
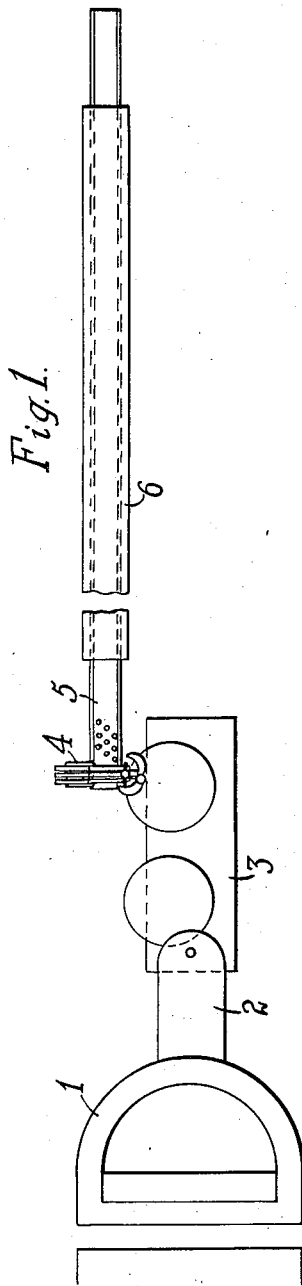
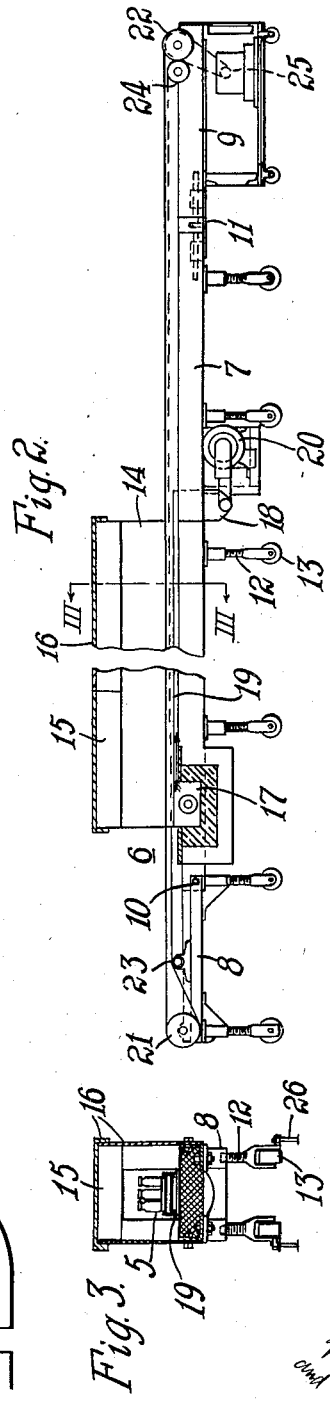
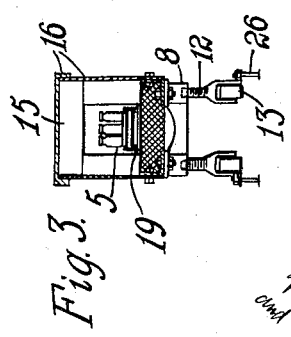
INVENTORS
William A. Morton
and Paul L. Geer
by William B. Jaspert.
Attorney.

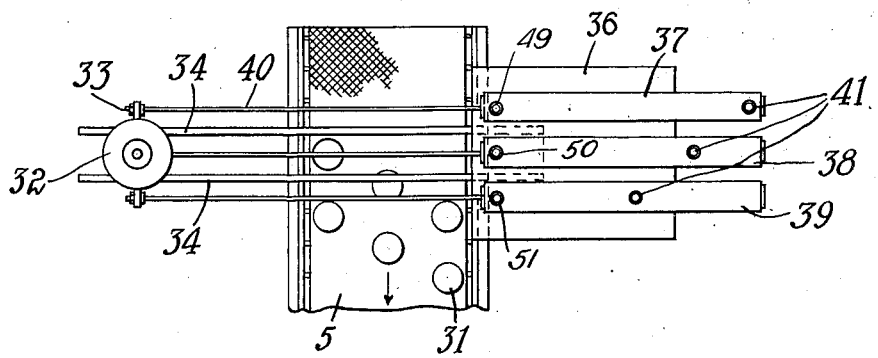
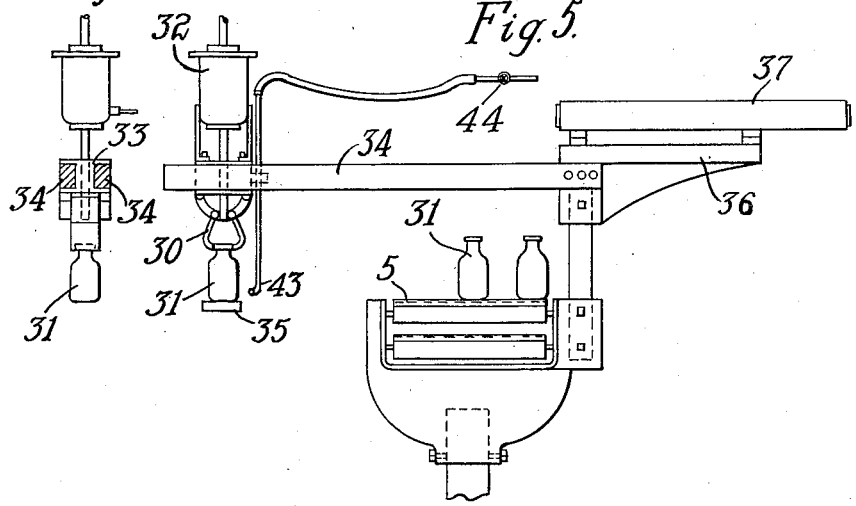

March 22, 1932. W. A. MORTON ET AL 1,850,968
GLASS TRANSFER MECHANISM
Filed June 24, 1929 3 Sheets-Sheet 3
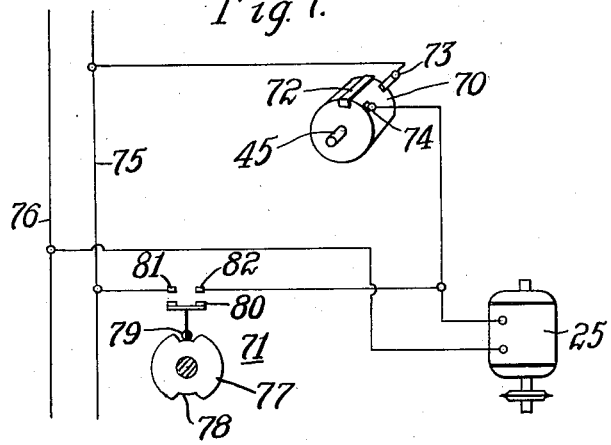
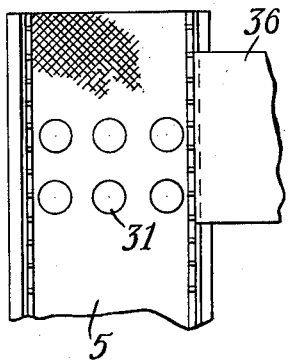
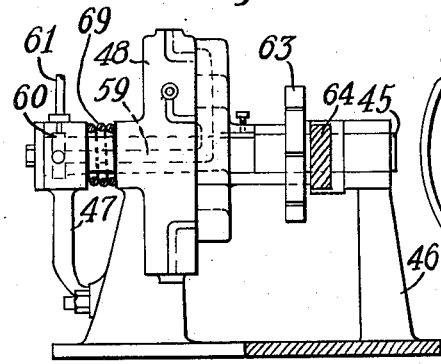
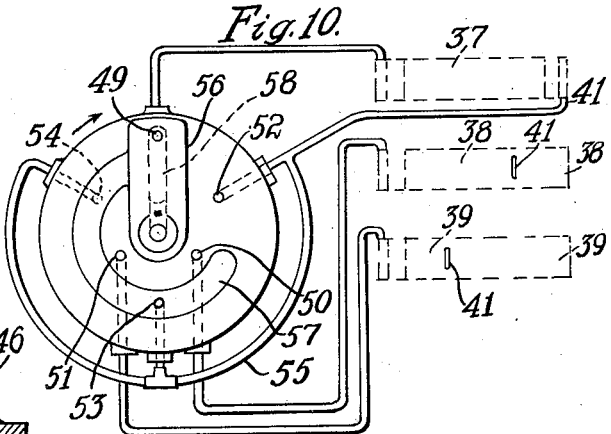
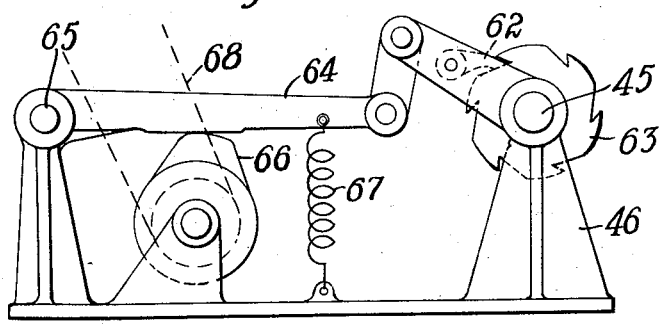
INVENTORS
William A. Morton
Paul L. Geer
by William B. Jaspert
Attorney.

Patented Mar. 22, 1932

1,850,968

UNITED STATES PATENT OFFICE

WILLIAM A. MORTON, OF DORMONT, AND PAUL L. GEER, OF PITTSBURGH, PENNSYLVANIA, ASSIGNORS TO AMCO, INCORPORATED, OF PITTSBURGH, PENNSYLVANIA, A CORPORATION OF PENNSYLVANIA

GLASS TRANSFER MECHANISM

Application filed June 24, 1929. Serial No. 373,143.

This invention relates to a method of and apparatus for treating glassware, more particularly for the handling of glassware after it is removed from the forming machine, including the heat treatment thereof, and this application is a continuation in part of an application bearing Serial Number 215,614, filed August 26, 1927.

It is among the objects of this invention to provide a method and apparatus for treating glassware which shall greatly facilitate the handling of the articles when transferring them from the forming machine to the heat treating lehr.

Another object of the invention is the provision of a special take-out device which is independent of the forming machine and which is adapted to place the formed articles on a lehr conveyor in transversely spaced rows, whereby substantially all of the supporting surface of the conveyor is efficiently utilized in the transportation of the articles through the annealing furnace.

Another object of the invention is the provision of a heat treating furnace that is especially designed to cooperate with the take out device in the handling of glassware and which is provided with an efficient heating means for subjecting the ware to a uniform heat treatment during the annealing operation.

These and other objects will become more apparent from a description of the accompanying drawings, in which like reference characters designate like parts and in which Fig. 1 is a diagrammatic view illustrating a glass melting furnace, a glass feeder stub, a glassware forming machine, a take-out device, and a heat treating lehr operating in accordance with the principles of this invention; Fig. 2 is a longitudinal sectional elevational view of the lehr furnace shown in Fig. 1, Fig. 3 a cross section taken along the line III—III, Fig. 2; Fig. 4 is a plan view of the take out device and a portion of the conveyor mechanism; Fig. 5 is a side elevational view of the take-out device; Fig. 6 a sectional elevational view of the gripper mechanism for engaging the glassware as will be hereinafter more fully explained; Fig. 7 a diagrammatic view of a motor control mechanism for advancing the lehr conveyor intermittently; Fig. 8 a plan view of a section of the receiving support or lehr conveyor; Fig. 9 a side elevational view of a regulating mechanism controlling the operation of the take-out device; Fig. 10 a diagrammatic view of the regulating valve shown in Fig. 9 showing its connection with the operating pistons of the take-out device, and Fig. 11 is a front elevational view of a portion of the mechanism, illustrated in Fig. 9.

Referring to Figs. 1 and 2 of the drawings, the structure therein illustrated comprises a glass furnace 1, a feeder stub 2 and a ware forming machine 3, which are herein illustrated as co-operating in the forming of glassware in a manner well known in the art, and which constitutes no part of the present invention. The take out device generally designated at 4, is more clearly illustrated in Figs. 4 and 5, and functions to deposit glassware which is removed from the forming machine to the extended end portion 5 of the lehr conveyor which traverses the lehr or heat treating furnace 6.

The lehr, generally designated at 6, comprises a sectional support consisting of a mid or central section 7 and end sections 8 and 9, the section 8 being pivotally joined to the central section 7 at 10, and the end section 9 is connected to the central section 7 by a screw mechanism 11 which is adapted to provide longitudinal adjustment of the frame sections to vary the tension of the conveyor belt 5. The frames 7, 8 and 9 are supported on adjustable legs 12 carrying rollers 13 to facilitate transporting the entire furnace from place to place in accordance with the demand on its use, and the end legs on the frame section 8 are further adjustable to elevate the extended end of the conveyor 5 or lower the same in accordance with the height of the ware which it is necessary to handle.

The furnace structure comprises an annealing tunnel 14 which is shown in Fig. 2 to be broke off, and which is, in actual use, of considerable length. The tunnel is formed of insulating material 15 protected by metal covering material 16. At one end of the tunnel is provided a combustion chamber and at its other end an exhaust chamber 18 with a flue or passage 19 communicating with the respective chambers, to take off the products of combustion and conduct them along the full length of the annealing tunnel. Suitable equipment, such as a motor driven fan or blower, 20, is provided to evacuate chamber 18 and and to draw the hot gases through the passage 19. The passage or duct 19 formed by the metallic walls is a single unit structure, which supports both the going and returning strands of the ware conveyor independent of the side walls or floor of the tunnel. The metallic portions are free to expand independent of the lehr floor and side walls. The tunnel is covered with sectional pieces of insulation for ready access to the interior of the lehr.

The conveyor 5 comprises an endless belt of fabricated wire which is passed over the rollers 21 and 22 mounted on the ends of sections 8 and 9 of the supporting frame and guide rollers 23 and 24. The roller 22 is driven by a motor 25 that is mounted in the end section 9.

Referring to Fig. 3 of the drawings, it will be noted that both the upper and lower portions of the conveyor 5 are shown above the flue passage 19 so that the lower strand of the conveyor is not subjected to a cooling temperature on its return movement to the charging end of the furnace, and it will be observed in Fig. 3 that the end legs of the frame may be fastened by clamping bolts 26 which function as temporary anchors when the machine is placed in its operative position with respect to the forming machine as shown in Fig. 1.

Referring to Figs. 4, 5 and 6 of the drawings, the takeout device comprises a toggle clamp or gripper 30 which is adapted to engage the glassware, such as a bottle 31, on the forming machine as it is brought in alinement with the takeout device, and the toggle mechanism is actuated by a fluid pressure cylinder 32 that is carried by a pusher head 33 which is movably mounted in a pair of guide rails 34. The pusher head traverses the guide rails from a position directly over the discharge portion 35 of the forming machine to the remote edge of the conveyor 5 and is actuated in its movement by a plurality of fluid pressure actuated pistons which are disposed in cylinders 37, 38 and 39 mounted upon a support 36. The piston members are respectively connected by rods 40 to the pusher head.

The piston rods 40 traverse different lengths of their cylinders, as shown by the location of the ports 41 and they are successively operated to bring the pusher head of the take-out device in different positions over the conveyor belt 5, such positions being illustrated by the transverse spacing of the glass articles 31 on the conveyor belt in Fig. 4.

In operation, the pusher head 33 is brought to its extended position as shown in Fig. 4, and after receiving the article 31 from the forming machine, it is actuated by cylinder 37 to move on the rails 34 to the innermost position of the article on the conveyor belt 5. The article 31 is there released and deposited on the conveyor belt. The pusher head is then again extended to engage another bottle 31 and it is returned to the conveyor mechanism by the cylinder 38, the piston of which is of such stroke that the bottle 31 is deposited at or near the central portion of the conveyor belt and upon the subsequent removal of a bottle from the forming machine, the pusher head is actuated by the cylinder 39 which returns it to the edge of the conveyor belt furthest remote from the actuating cylinders and the ware is deposited in the position shown in Fig. 4. On account of the conveyor belt 5 being in constant motion in the direction of the arrow during the operation of the take out device, the ware will be deposited in transversely spaced rows at a slight angle to the transverse plane of the conveyor, as shown in Fig. 4. The operation of the take out device and the speed of the conveyor are so related that when the last bottle has been deposited on the conveyor belt, thus completing one row, the next full stroke of the pusher head will clear the bottle last deposited on the conveyor, but outside of this relative function of the conveyor and take out device, no particular coordination of functions is necessary.

The ware as it is removed from the forming machine, is sufficiently plastic to take the imprint of the wire fabric belt conveyor on which it is placed and to prevent this, a cooling air blast is applied to the article from an air pipe 43 which is mounted on the pusher head 33 to traverse back and forth with the latter on the rails 34. The air supply in the pipe line 43 may be controlled by a valve 44, Fig. 5.

The operation of the gripper in its conveyor traversing movements is controlled by the mechanism shown in Figs. 9 to 11 inclusive, in which a shaft 45 is journalled at one end in pedestal 46 and at its other end in a pedestal 47. Shaft 45 extends through a control valve mechanism comprising a stationary member 48 having a series of air ports, 49, 50 and 51 which are connected to the ends of cylinders 37, 38 and 39 respectively, and 52, 53 and 54 which are connected by a common line 55 to the opposite end of cylinder 37.

A slide valve 56 having a curved arm 57 is mounted to rotate with shaft 45 and is further provided with a channel or groove 58 on the side adjacent the port openings of stationary member 48. The channel 58 is of such length as to cover all of the ports during the rotary movement with shaft 45 and one end thereof is connected by passage 59 to an annular chamber 60 communicating with a source of fluid pressure at 61. Shaft 45 carrying slide valve 56 is rotatable by a pawl and ratchet mechanism 62 and 63 respectively and pawl 62 is actuated by a lever 64 that is hinged at 65 and operated by a cam 66.

Lever 64 is biased by a coil spring 67 against the face of cam 66 and the latter is connected by a drive chain 68 to the ware forming machine 3. Shaft 45 is biased by a spring 69, Fig. 9, to urge the rotary valve 56 against the face of members 48.

In operating the gripper mechanism 32 the valve mechanism operates as follows: With valve 56 in the position shown in Fig. 10, fluid pressure in channel 58 passes through port 49 to the end of cylinder 37 causing gripper 32 to traverse across conveyor 5 to the side of the conveyor nearest the operating cylinders. By movement of cam 66 which is timed with forming machine 3 shaft 45 is indexed one notch by pawl and ratchet 62 and 63 bringing channel 58 of valve 56 in alinement with port 52 and simultaneously opening port 49 to atmosphere. Since there are six notches in ratchet 63 and six ports in valve mechanism 48 one port will always be in communication with channel 58 whereby pressure is communicated to one of the cylinders.

Cylinder 37 is utilized for all return movements of the gripper to avoid unnecessary connections with the valve, but the return end of cylinder 37 is connected with ports 52, 53 and 54 by the line 55 to secure proper timing of the return gripper movements with the movement produced through valve 56 communicating pressure through ports 49, 50 and 51.

As previously explained the ware 31 is placed diagonally across conveyor 5 when the latter is moving during the operation of the gripper mechanism. However, the ware may be placed in straight transverse rows on the conveyor as shown in Fig. 8, if the conveyor is advanced intermittently. Suitable mechanism for effecting such intermittent movement is shown in Fig. 7 of the drawings, wherein 25 designates the conveyor drive motor shown in Fig. 2, which is electrically connected with a rotary switch 70 mounted to rotate with shaft 45 of the valve mechanism and a circuit interrupter 71. Switch 70 comprises a drum having a conductor bar 72 and a pair of terminal brushes 73 and 74. Brush 73 is connected to a power line 75 and brush 74 to the motor which latter is also connected to power line 76.

The circuit interrupter 71 comprises a cam 77 which is geared to the drive of conveyor 5 in any suitable manner to be rotatable with the movement of the conveyor. Cam 77 is interrupted at portion 78 which are 180° apart and a follower 79 is adapted to continuously engage the face of the cam. Follower 79 is provided with a pair of shunted contacts 80 which cooperate with contacts 81 and 82 that are respectively connected to line 75 and the motor connection with brush 74.

In operation drum 70 carried by shaft 45 makes one complete revolution for a complete cycle of three operations of the gripper whereby brushes 73 and 74 contact with bar 72 forming a circuit connection of the conveyor drive motor 25 with power line 75. When the motor is energized the conveyor 5 advances and cam 77 is rotated by virtue of its operative connection with the conveyor drive. Upon initial movement of the cam follower 79 is lifted out of the shallow portion 78 thereby closing contacts 80, 81 and 82 to establish a circuit with motor 25 just before brushes 73 and 74 pass from bar 72. The motor circuit is maintained until follower 79 drops into portion 78 of the cam breaking contacts at 80. The movement of follower 79 between portions 78 of the cam corresponds to the distance of the travel of conveyor 5 to obtain the desired spacing of the rows of ware as shown in Fig. 8 of the drawings. The spacing may be varied by providing more notches in the cam or by changing the ratio of rotation of the cam to the speed of travel of the conveyor. When it is desired to operate the conveyor continuously it may of course be switched directly in the power circuit.

By the use of the take out and lehr furnace, as herein set forth, the production of a glass forming machine can be handled with facility and dispatch and by a minimum of mechanical equipment or manual labor. By placing the ware in transversely spaced rows in the manner illustrated, the length of the lehr furnace may be materially reduced, thus reducing the cost of equipment and economizing on floor space; and by employing a take-out device of the construction described herein, the ware is subjected to but a single contact during the removal from the forming machine to the lehr, thus assuring that all of the ware enters the heat treating furnace at a substantially uniform temperature. It is also evident that the special construction of the lehr permits of quick and simple vertical adjustment of the conveyor belt and receiving portion of the conveyor and in addition provides an efficient heating unit which assures a uniform treatment of the product.

Although one embodiment of the invention has herein been illustrated and described, it will be obvious to those skilled in the art that various modifications may be made in the details of construction and in the design and arrangement of the several cooperating parts without departing from the principles herein set forth.

We claim herein as our invention:

1. A loading device for transferring ware from a forming machine to a conveyor comprising a gripping means for engaging the ware, fluid pressure means for moving said gripping means transversely of a conveyor belt, a rotary valve controlling the application of said pressure means to stop the gripping member at different stop positions transversely of a conveyor belt, and cam actuating mechanism for said rotating valve to control the movement thereof.

2. A loading device for transferring ware from a forming machine to a conveyor comprising gripping means operable on a horizontal slide for engaging ware from a forming machine, fluid pressure means for moving said gripping means, a rotary valve controlling the movement of the gripping means on said guide, and cam mechanism for actuating said valve, said cam mechanism being actuated by a connection with a ware forming machine to synchronize the movements of said loading device in accordance with the movements of said forming machine.

3. A loading device for transferring ware from a forming machine to a conveyor comprising gripping means operable upon a horizontal slide, fluid pressure means for moving said gripping means, a rotary valve controlling the application of said pressure means to move the gripping means to different stop positions on its guide, an actuating mechanism for said guide comprising a ratchet device having cam means operating the same, said cam means being connected to a ware forming machine to coordinate the movements of the gripping device with the movements of said machine.

In testimony whereof we have hereunto set our hands this 22 day of June, 1929, at Pittsburgh, Pa.

WILLIAM A. MORTON.
PAUL L. GEER.